United States Patent Office 3,605,541
Patented Sept. 20, 1971

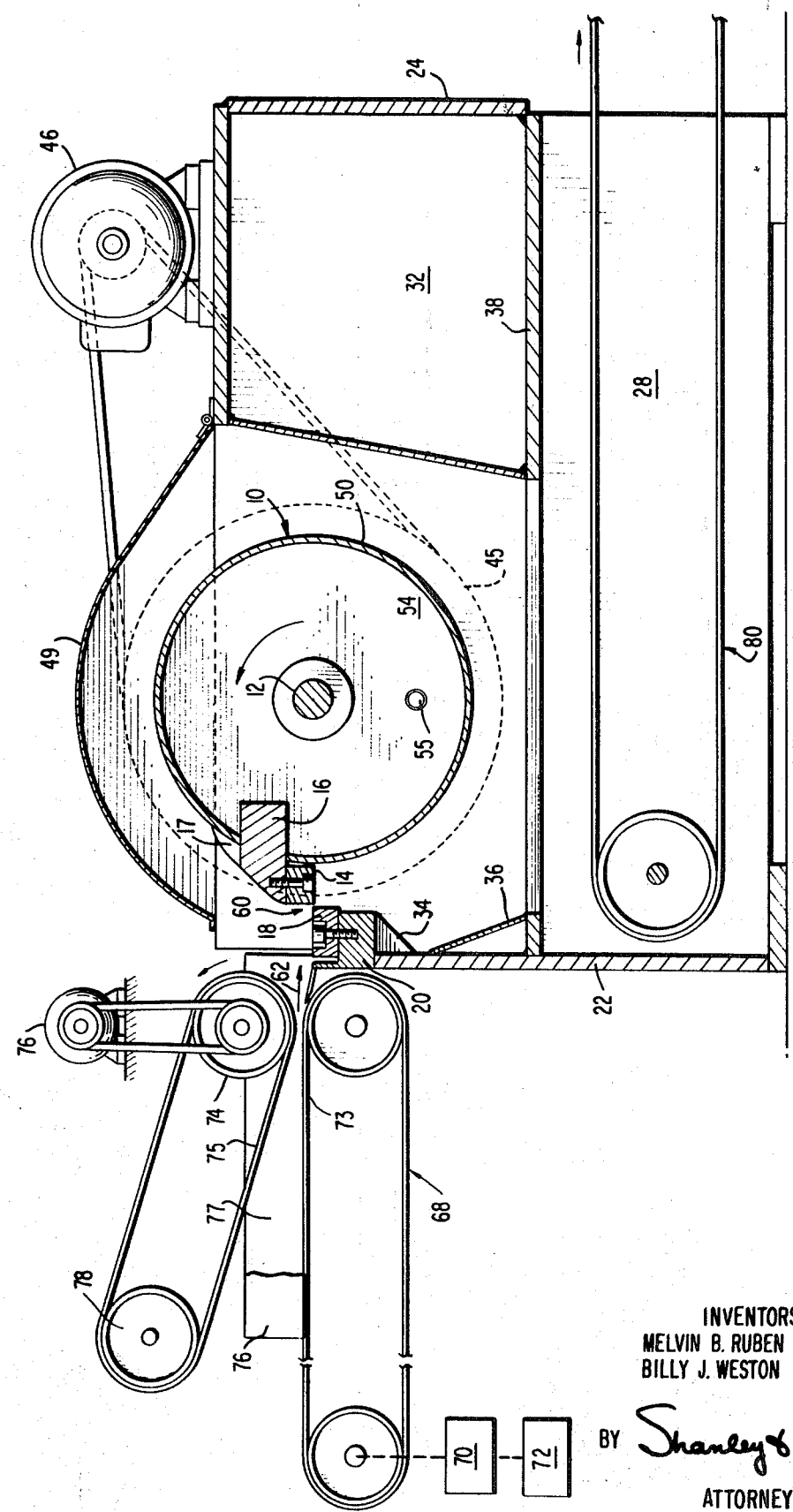

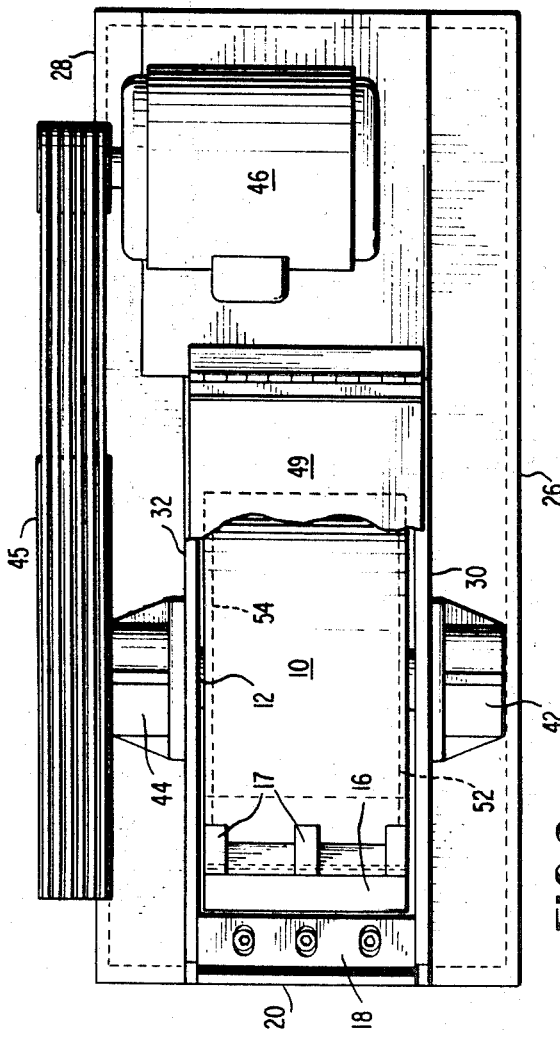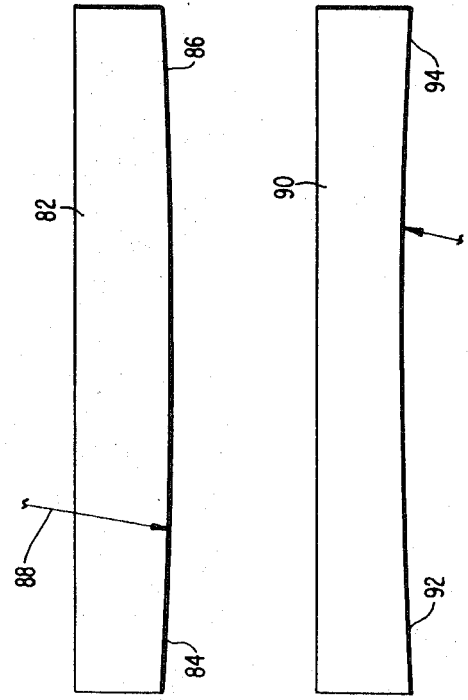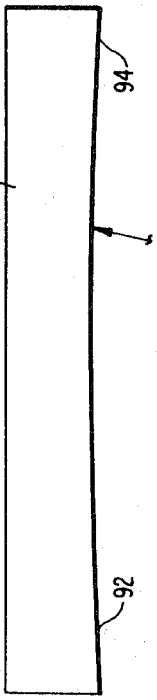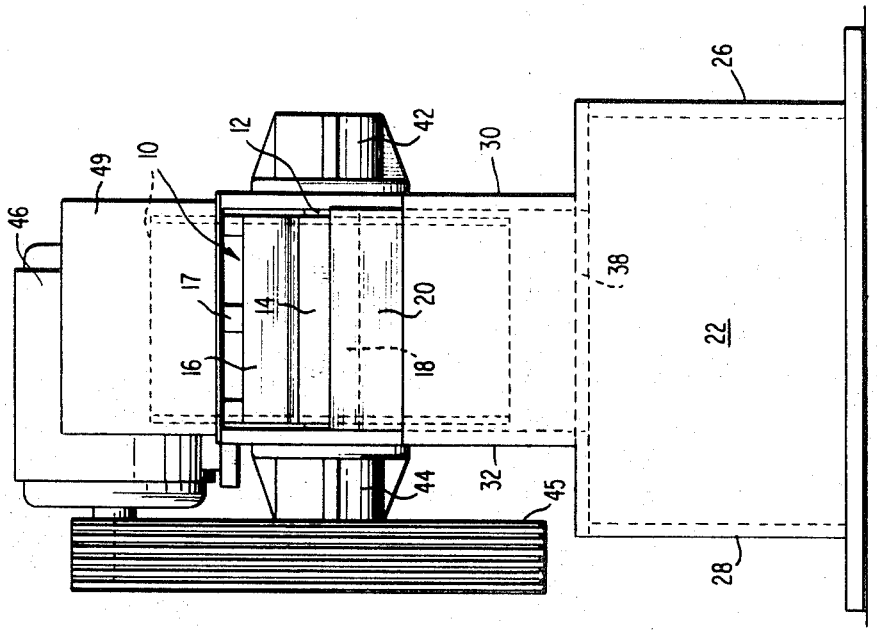

3,605,541
ROTARY SHEAR AND SCRAP PREPARATION METHOD
Melvin B. Ruben, Skokie, and Billy J. Weston, Chicago, Ill., assignors to Electronic Memories & Magnetics Corporation, Hawthorne, Calif.
Filed Apr. 11, 1969, Ser. No. 815,354
Int. Cl. B23d 17/04
U.S. Cl. 83—355                                   24 Claims

ABSTRACT OF THE DISCLOSURE

High capacity shearing to prescribed lengths of various materials from rigid rods to pliable wire is provided by a rotary drum shear, eccentrically weighted, with a cutting blade peripherally mounted so as to utilize the eccentric weighting to increase the force available for heavy-duty scrap cutting usage. Elongated scrap material to be cut to length is fed radially inwardly toward the axis of rotation of the drum between a fixed blade and the drum mounted blade. With this system cutting force is uniform across the full length of the cutting blades. Material feed is controlled both as to speed and presentation. Feed rate, coordinated with r.p.m. of the shear drum, controls length of cut. Conveying and hold down structures control presentation of material and hold material during cutting. The rotary drum sweeps cut material toward discharge means. The principle of operation permitting positive control of feeding, shearing, and discharging minimizes safety hazards to personnel.

---

This invention is concerned with rotary shearing. More particularly, this invention is concerned with preparation of scrap metal received in elongated form, such as wire, tubing, bars, strapping, and the like, which is to be cut to predetermined size for further processing. In its more specific aspects, the invention is concerned with high-capacity, continuous-operation rotary shearing involving cutting elongated shapes into predetermined lengths.

For the heavy-duty cutting required for scrap metal preparation the art has relied on lever-type, force-multiplying, shearing machines known as alligator shears as shown in Pat. No. 2,370,311. As a result, heavy-duty scrap preparation involving the cutting of elongated metal shapes into predetermined lengths has been limited to an intermittent type of operation characteristic of such shears. Dependent on the model, alligator shears can be cycled to provide ten (10) cuts per minute, and higher, up to about sixty (60) cuts per minute but cannot normally be cycled much faster because of complicated cycling mechanisms and the principle of operation. Customarily alligator shears are hand-fed and manually operated. Working at a normal maximum rate of sixty (60) cycles per minute and being fed by one or more operators permits handling a maximum of about two hundred fifty to three hundred fifty pounds (250–350 lbs.) per hour of copper tubing, being cut, for example, into shoveling stock size (about two (2) to six (6) inches maximum).

While such prior art shears are admirably suited for heavy-duty cutting of bars, tubing, and similar rigid material, they are not particularly suited for economic handling of light-weight, non-rigid material, such as pliable wire, electrically insulated appliance cordage, and the like. However, it has been necessary to use alligator shears for such work since no high capacity shear for light-weight work, which could also handle heavy-duty cutting, has been available to the art prior to the present invention.

The prime objective of the present invention is to provide a high-capacity shear for heavy-duty usage on rigid materials and on light-weight non-rigid materials wherein the feed can be continuous and automated and shearing can be on a continuous basis rather than intermittent. The net effect is that cutting capacity in preparing normally handled scrap, such as copper tubing, brass rods, electric wiring, cable stock, and the like, is multiplied many fold without sacrifice of strength or durability. To accomplish these ends the invention utilizes a unique principle in rotary shearing involving a specially weighted rotary drum which provides for a continuous-type shearing operation providing a cutting thrust or force normally limited in the prior art to an intermittent-type shear operation.

In addition to high-capacity handling of a variety of materials, the invention provides safety features for operating personnel not available in the prior art and automated control of cutting size not possible with prior art structures.

A specific embodiment of the invention is shown in the accompanying drawings, in which:

FIG. 1 is a side view, partially in cross-section of apparatus embodying the invention, FIG. 2 is a top plan view of a portion of the apparatus of FIG. 1 excluding the drive means, FIG. 3 is an end view of the apparatus of FIG. 1, and FIG. 4 and FIG. 5 are detailed views of cutting blade means for use with the apparatus of FIG. 1.

Scrap preparation apparatus illustrated includes a rotary shear drum 10 mounted for rotation on a centrally located shaft 12. Integral with the shear drum 10 is shear blade 14 mounted eccentrically with relation to the central longitudinal axis of the drum. Shear blade 14 is backed by shear blade support 16 and support gusset 17 on the periphery of the drum and, as shown, is additionally supported internally by extending support 16 radially inwardly and securing it to the endwall structure of drum 10.

As shown in FIG. 1, a fixed shear blade 18 is mounted contiguous to moving blade 14 at the points of tangency of the cutting edge of the moving blade 14 defined by rotation of shear drum 10. Fixed shear blade 18 is supported by mounting block 20. Clearance between the blades can be adjusted by the mounting bolts shown and is set at two thousandths of an inch (.002″) in the embodiment shown.

The framing support includes lower frame end plate 22 and top frame end plate 24, lower side plates 26 and 28 and top frame side plates 30 and 32. Blade holder gusset 34 extends between mounting block 20 and frame end plate 22. Baffle plate 36 extends between frame end 22 and frame spacer plate 38.

Shaft 12 of shear drum 10 is supported by framing plates 30 and 32 by means of bearings 42 and 44, respectively. Drum shaft 12 is turned by drive wheel 45 which is belt driven by motor 46. Shear guard 49 is part of the safety features to be discussed in more detail later.

Shear drum 10 has a generally cylindrical configuration in a cross-sectional plane which is perpendicular to the axis of rotation. Preferably the drum sidewall 50 and endwalls 52 and 54 are solid framing plates presenting continuous outer surfaces. The shear blade support 16 and support gusset 17 are eccentrically mounted with respect to the axis of rotation on the sidewall periphery of the drum. Extending support 16 inwardly of sidewall 50 distributes the shearing force internally of the periphery of drum 10. The blade 14, support 16 and gusset 17 provide an imbalanced or eccentric weighting of the drum with respect to the axis of rotation 12.

As shown in FIG. 1, the direction of rotation of shear drum 10 is counterclockwise. The radially outward points of tangency defined by blade means 14 upon rotation of drum 10, in combination with the contiguously located fixed blade 18 defines work area 60 between the cutting blades. Scrap material to be cut into predetermined lengths is fed in a direction radially inwardly toward the drum shaft 12 over fixed cutting blade 16 as shown by arrow 62.

The length of cut for rigid material in the embodiment shown is limited by the radial length between the cylindrical sidewall 50 of drum 10 and the radially outward edge of blade 14. However the length of cut can be increased by changing the size of the drum and width of the blade or changing the configuration of the drum especially in a sector or sectors of the drum contacting the scrap metal prior to shearing, e.g. by utilizing a diminishing radius on the drum sidewall in such sector or sectors.

Preferably rotary drum 10 is ballast weighted, by filling the interior hollow portion of the drum with lead or other suitable ballast. Removable plug 55 is provided for this purpose. The weight of the drum and its ballast provides a flywheel effect for smoother operation. The eccentric weighting provides a multiplied force which has a whip effect at the point of shear enabling the apparatus to handle shearing jobs which could only be handled previously by the complicated force multiplying mechanisms requiring shear structure having a size and weight many times that of the present apparatus.

In effect, the imbalanced force of the eccentric weighting, confined to a circular path by the bearings, is absorbed in shearing which may slow down rotation of the drum instantaneously. This force is built up again during a revolution of the drum so that the eccentric weighting has a whip effect increasing the force applied at cutting above the force which can be traced to the weight of the drum and ballast alone.

The drum 10 is driven to rotate at a prescribed r.p.m. making possible continuous-type operation rather than intermittent operation. This permits the feed to be continuous at a linear speed per unit of time coordinated with the revolutions per unit of time of the drum.

Referring to FIG. 1, continuous feed is provided by means of continuous conveyor 68 with drive means 70 and speed control 72. The feed material is additionally controlled so that, regardless of whether rigid or pliable material is being fed into the shears, the material is held and bounded to present, in effect, a semi-solid configuration for cutting at work area 60. This control of feed material is exerted on the bottom surface by conveyor belt 73, on the upper surface by weighted roller 74 and belt 75 and on the side surface by side bands 76, 77 forming part of the conveyor guard structure. Weighted roller 74 and upper belt 75 are independently driven, in the direction indicated, by motor 79. Roller 78 is fixed and provides the pivot point about which weighted roller 74 is raised and lowered, within limits of the feed opening, to adjust to the material being fed and to compact such material by exerting a force on the material transverse to the direction of feed.

This conveyor system, with hold down and guards contribute significantly to elimination of personnel safety hazards. Workmen feeding material to be sheared can be as far removed from the cutting area as desired, as determined by the length of the conveyor. The compacting and holding of the material for cutting is performed by the conveyor and hold down structure. Upward snapping of the material during cutting is prevented by the hold down structure. After cutting the material is thrown downwardly by the rotary drum and cutting blade with shielding being provided by the framing 22, 26, 28 discussed earlier. The material is deposited on discharge conveyor 80. The cut material is carried on by conveyor 80 to further processing equipment.

A number of advantages of the invention should be apparent from the description thus far. Note that with the rotary drum feature and feeding radially inwardly toward the axis of rotation the moving blade can be structurally supported along its full longitudinal length and does not depend on cantilever support as in prior art structures. This factor considerably reduces the massiveness of the apparatus as compared to other heavy-duty cutting devices.

Also, the blade has a substantially uniform cutting force across its full longitudinal length as distinguished from prior art scrap cutting devices where the greatest cutting force is exerted at the "nip" of the cutting blades, i.e. at the point closest to the pivot point of the prior art shears. In fact, in such prior art devices where there is a scissors-type action between a moving and a fixed blade, efforts are made to cut as close to the nip as possible to obtain the greatest cutting force and a clean cut rather than a wiping action at points removed from the nip. In effect, use of the full longitudinal length of such blade is never obtained in the prior art but use of full longitudinal length of the blades can always be obtained with equal cutting facility at every point with the present invention.

Further, the rotary drum itself carries away cut material safely with a sweeping or impelling action upon cuttings which directs such material toward discharge at a differing level and direction than feed. This action prevents "flying back" of cut pieces as in prior art shears. Combining this feature with shielding the conveyor feed, shielding of the drum itself, and the hold down feature contributes greater safety than any known scrap cutting apparatus.

Control of cut product length can be provided by controlling the shear drum and the feed conveyor individually or in coordination. In the embodiment shown in the drawings the radial depth of the shear blade 14 is three (3) inches. Bearing strength and the amount of eccentric weighting can have a limiting effect on r.p.m. in practice; the r.p.m. has been set in the embodiment shown at two hundred (200) r.p.m. With two hundred (200) r.p.m. and a three (3) inch blade, six hundred (600) inches per minute of rigid material, such as tubing or bar stock, can be cut. Therefore to operate at full capacity with rigid material and make three-inch cuts, the conveyor speed should be set at six hundred (600) inches per minute (50 f.p.m.). In order to make two-inch (2") cuts the speed of the conveyor would be set at four hundred (400) inches per minute.

With non-rigid material, such as electrical wiring, the length of cut can be increased to any convenient size by increasing the speed of the conveyor since pliable material will be bent downwardly by the rotary drum making possible the customary twelve (12) or fifteen (15) inch cuts, or cuts of any reasonable length.

In the specific embodiment illlIstrated the cutting blades have a length of fourteen inches (14") and a width of three inches (3") and the framing structure supporting the drum and fixed cutting means is one inch (1") steel plate. The drum has a ballast of approximately twenty-five hundred pounds (2500 lbs.), sidewall of one-half inch (½") steel plate and endwalls of three-fourth inch (¾") steel plate. The drum is driven at two hundred revolutions per minute (200 r.p.m.). Typical capacities for rigid materials obtained with this apparatus are:

|  | Diameter (inches), up to— | Capacity (lbs./hr.), up to— |
|---|---|---|
| Copper: | | |
| Pipe | 1½ | 4,000 |
| Tubing | 3 | 3,000 |
| Rod | 1 | 5,000 |
| Bus bar | 1 [1] | 6,000 |
| Cable | 2 | 5,000 |
| Brass: | | |
| Pipe | 1½ | 3,000 |
| Rod | ¾ | 5,000 |
| Bronze: | | |
| Pipe | 1¼ | 3,000 |
| Rod | ¾ | 5,000 |
| Cupro nickel: | | |
| Pipe | 1¼ | 3,000 |
| Wires | | 4,000 |
| Aluminum: Insulated cable | | 2,500 |

[1] Square.

The invention also permits selection of cutting blade configurations. Cutting blade 14 is straight-edged with its cutting edge being rectilinear and lying in the same radial plane extending from the axis of rotation 12. With this type of blade, cutting takes place at the same instant across its full length.

When cutting heavy materials a blade, such as that shown in FIG. 4 may be used. The cutting edge of blade 82 of FIG. 4 does not lie in the same radial plane but is curved upwardly (opposite to direction of rotation) at 84, 86 in approaching the longitudinal ends of the blade. Facing the blade this presents a slight "smile" configuration. With this configuration the central portion 87 starts cutting an instant before cutting starts near the longitudinal ends 84, 86. The effect is to spread the cutting force required slightly and the result is smoother operation. A typical radius 88 for the curved portion of the blades is between eighty (80) and eighty-five (85) inches which raises longitudinal ends about one-eighth inch (⅛″) with respect to the central portion.

When cutting light-weight, pliable material a "half moon" configuration cutting edge, such as shown on blade 90 in FIG. 5 is used. In this configuration, the cutting edge is curved downwardly (in the direction of rotation) at the longitudinal ends 92, 94 of the blade. This blade exerts a compacting effect on the material and prevents spreading outwardly (in an axial direction with respect to the drum) during cutting of pliable material.

The hold down feature described above includes a weighted roller and pivoted mounting. It is to be understood that other means may be used, such as a spring mounted roller or rollers. Also the framework support for both the rotary drum and fixed block can be modified without departing from the teachings of the invention. Similarly, means for attaching and supporting the cutting blades, the framing, and ballasting the drum can be modified within the teachings of the invention. Other modifications in configuration, materials, mechanical drive means, and controls shown in the specific embodiment can be resorted to while relying on the novel teachings of the present invention so that the scope of the present invention is to be determined from the appended claims.

What is claimed is:

1. High capacity cutting apparatus suitable for scrap preparation permitting continuous-feed shearing of elongated material, such as metallic wire, tubing, bars, strapping, and the like, comprising rotatable means having a centrally located axis of rotation, endwall structure, and sidewall structure, said rotatable means carries positionally fixed ballast internally of said endwall structure and said sidewall structure, the rotatable means being weighted eccentrically with respect to the centrally located axis of rotation and carrying cutting means located contiguous to a peripheral portion of the sidewall structure of the rotatable means so as to define a cylindrical path concentric with such centrally located axis upon rotation of the rotatable means, and fixed cutting means supported to be contiguous to the cylindrical path defined by the cutting means carried by the rotatable means upon rotation of the rotatable means.

2. The apparatus of claim 1 in which the cutting means carried by the rotatable means is disposed radially with respect to the centrally located axis of rotation.

3. The apparatus of claim 2 in which the cutting means carried by the rotatable means is disposed radially outwardly from the peripheral portion of the sidewall structure of the rotatable means and the fixed cutting means is disposed substantially perpendicular to a plane tangent to the cylindrical path defined by the cutting means carried by the rotatable means.

4. The apparatus of claim 2 in which the rotatable means comprises a rotary drum means with the cutting means carried by the rotary drum means being elongated and extending longitudinally over substantially the full axial length of the rotary drum means, the elongated rotary cutting means having a longitudinal axis which is substantially parallel to the centrally located axis of rotation of the rotary drum means.

5. The apparatus of claim 4 in which the cutting means has a rectilinear cutting edge extending along its full longitudinal length.

6. The apparatus of claim 4 in which the cutting means has a cutting edge having curvilinear portions.

7. The apparatus of claim 6 in which the curvilinear portions of the cutting edge are located contiguous to longitudinal ends of the cutting means and curve toward the direction of rotation of the rotary drum means.

8. The apparatus of claim 6 in which the curvilinear portions of the cutting edge are located contiguous to the longitudinal ends of the cutting means and curve in a direction opposite to the direction of rotation of the rotary drum means.

9. The apparatus of claim 1 in which the cutting means carried by the rotatable means is located contiguous to the eccentric weighting of the rotatable means.

10. The apparatus of claim 4 in which the sidewall structure and endwall structure of the rotary drum means present continuous outer surfaces.

11. High capacity cutting apparatus suitable for scrap preparation permitting continuous-feed shearing of elongated material, such as metallic wire, tubing, bars, strapping, and the like, comprising rotatable means having a centrally located axis of rotation, endwall structure and sidewall structure, the rotatable means being weighted eccentrically with respect to the centrally located axis of rotation and carrying cutting means located contiguous to a peripheral portion of the sidewall structure of the rotatable means so as to define a cylindrical path concentric with such centrally located axis upon rotation of the rotatable means, the rotatable means comprises a rotary drum means with the cutting means carried by the rotary drum means being elongated and extending longitudinally over substantially the full axial length of the rotary drum means, the elongated rotary cutting means having a longitudinal axis which is substantially parallel to the centrally located axis of rotation of the rotary drum means, the sidewall structure and endwall structure of the rotary drum means present continuous outer surfaces and carry positionally fixed ballast internally of the sidewall and endwall structures, and fixed cutting means supported to be contiguous to the cylindrical path defined by the cutting means carried by the rotatable means upon rotation of the rotatable means.

12. High capacity cutting apparatus suitable for scrap preparation permitting continuous-feed shearing of elongated material, such as metallic wire, tubing, bars, strapping, and the like, comprising rotary drum means having a centrally located axis of rotation, endwall structure, and sidewall structure, the rotary means being weighted eccentrically with respect to the centrally located axis of rotation and carrying cutting means located contiguous to a peripheral portion of the sidewall structure of the rotary drum means so as to define a cylindrical path concentric with such centrally located axis upon rotation of the rotary drum means, the rotary drum means carries backup support means for the cutting means on a peripheral portion of its sidewall structure, the backup support means extending radially outward from such sidewall structure and the cutting means comprises elongated blade means removably secured to such backup support means, and fixed cutting means supported to be contiguous to the cylindrical path defined by the cutting means carried by the rotary drum means upon rotation of the rotary drum means.

13. The apparatus of claim 12 including support means for the cutting means extending radially inwardly of the sidewall structure of the rotary drum means.

14. The apparatus of claim 12 further including power drive means connected by means of belts with the rotary drum means for driving the drum means at a selectively controllable rate.

15. The apparatus of claim 12 including means for feeding material to the rotary drum means, said feeding means comprising conveyor means for continuosly feeding such material beyond the fixed cutting means in a substantially radial direction toward the centrally located axis of the rotary drum means.

16. The apparatus of claim 15 in which the means for feeding material to be sheared includes a continuously operable means with means for adjusting rate of feeding material to control the length of material cut.

17. The apparatus of claim 15 in which the means for feeding material includes a continuously operable conveyor means and further including
   power drive means for the rotatable means, and
   means for controlling the rate of feed of the coninuously operable conveyor means.

18. The apparatus of claim 15 further including means for adjusting the speed of rotation of the rotary drum means to control the length of the material cut.

19. The apparatus of claim 15 including means for adjusting the rate of feed of material to be cut, means for controlling the rotational speed of the rotary drum means, and means for coordinating the rate of feed of material to be cut and rotational speed of the rotary drum means to control the length to cut of material being fed to the apparatus.

20. The apparatus of claim 15 in which the means for feeding material to be cut to length includes
   conveying means for supporting and moving such material, and
   hold down means located contiguous to the fixed cutting means for exerting a force on the material to be cut in a direction toward the conveying means.

21. The apparatus of claim 20 in which the hold down means includes a driven roller means for exerting a compacting force on the material to be cut to length.

22. The apparatus of claim 20 in which the hold down means comprises a driven belt means contacting the material to be cut and having a linear speed coordinated with that of the conveyor means.

23. The apparatus of claim 20 further including means extending between the conveying means and the hold down means for confining material therebetween to a fixed path directed radially toward the centrally located axis of the rotary down means.

24. The apparatus of claim 15 further including discharge means located in spaced relationship to the fixed cutting means in the direction of rotation of the rotary drum means for receiving cut material.

References Cited

UNITED STATES PATENTS

| | | | |
|---|---|---|---|
| 2,045,721 | 6/1936 | Penwell | 83—355 |
| 2,261,968 | 11/1941 | Matthews | 83—355X |
| 3,017,797 | 1/1962 | Hercik | 83—355X |
| 3,060,778 | 10/1962 | Karber | 83—355 |
| 3,186,278 | 6/1965 | Palmleaf | 83—355 |
| 3,334,533 | 8/1967 | Davis, Jr. | 83—355X |
| 3,350,971 | 11/1967 | Schneider. | |

WILLIAM S. LAWSON, Primary Examiner

U.S. Cl. X.R.

83—923